United States Patent
Toshima et al.

(10) Patent No.: US 7,535,642 B2
(45) Date of Patent: May 19, 2009

(54) LIGHT CONTROL SHEET AND SURFACE LIGHT SOURCE USING THE SAME

(75) Inventors: Yasumaro Toshima, Saitama (JP); Susumu Kurishima, Saitama (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 10/594,723

(22) PCT Filed: Apr. 1, 2005

(86) PCT No.: PCT/JP2005/006458

§ 371 (c)(1),
(2), (4) Date: Sep. 29, 2006

(87) PCT Pub. No.: WO2005/098485

PCT Pub. Date: Oct. 20, 2005

(65) Prior Publication Data

US 2007/0273975 A1   Nov. 29, 2007

(30) Foreign Application Priority Data

Apr. 9, 2004  (JP) .............................. 2004-115443

(51) Int. Cl.
  *G02B 13/20*  (2006.01)
(52) U.S. Cl. ...................................... 359/588
(58) Field of Classification Search ................ 359/599, 359/707, 831–837
See application file for complete search history.

(56) References Cited

U.S. PATENT DOCUMENTS

| 6,287,743 B1* | 9/2001 | Oakland et al. ............. 430/201 |
| 2002/0154087 A1 | 10/2002 | Katsu et al. ................. 345/102 |
| 2003/0083158 A1 | 5/2003 | Ishino ........................ 473/378 |
| 2003/0174518 A1* | 9/2003 | Toshima et al. ............. 362/558 |
| 2003/0179456 A1* | 9/2003 | Uchida et al. ............... 359/599 |

FOREIGN PATENT DOCUMENTS

| JP | 2000-353413 | 12/2000 |
| JP | 2001-235606 | 8/2001 |
| JP | 2001-305346 | 10/2001 |
| JP | 2001-305770 | 11/2001 |
| JP | 2003-344982 | 12/2003 |

* cited by examiner

*Primary Examiner*—Thong Nguyen
(74) *Attorney, Agent, or Firm*—Bacon & Thomas, PLLC

(57) ABSTRACT

A light control sheet comprises at least a light diffusing film and a prism sheet, wherein the light diffusing film has a light diffusing surface on one side and a rough surface on the other side, the prism sheet has a prism surface on one side and a smooth surface on the other side, the smooth surface has a smooth layer comprising at least a comb polymer, and the rough surface of the light diffusing film and the smooth surface of the prism sheet face each other. A light control sheet comprises at least a light diffusing film and a prism sheet, wherein the light diffusing film has a light diffusing surface on one side and a smooth surface on the other side, the smooth surface has a smooth layer comprising at least a comb polymer, the prism sheet has a prism surface on one side and a rough surface on the other side, and the smooth surface of the light diffusing film and the rough surface of the prism sheet face each other.

20 Claims, 3 Drawing Sheets

LIGHT CONTROL SHEET AND SURFACE LIGHT SOURCE USING THE SAME

BACKGROUND a. Technical Field

The present invention relates to a light control sheet which constitutes a part of a surface light source suitably used as a backlight of a liquid crystal display etc., and a surface light source using the light control sheet.

b. Background Art

Surface light sources called edge light type backlights are conventionally used for liquid crystal displays and so forth. In general, in such surface light sources, a light reflecting sheet is laminated on a surface opposite to a light emerging surface of a light guide panel, at least one of which sides is provided with a light source of a cold-cathode tube or the like, and a light diffusing film and two or more upward prism sheets (prism sheets designed so that a prism surface should serve as a light emerging surface) are laminated on the light emerging surface of the light guide panel.

Further, in recent years, it is being attempted to develop surface light sources with so-called superior cost performance, in which the number of prism sheets laminated in a plural number is reduced to reduce the cost even with increasing front luminance (luminance for the direction of the normal of the light emerging surface of the light guide panel).

Examples of such surface light sources include those utilizing a prism sheet called downward prism sheet. Common prism sheets are designed so that the prism surface should serve as a light emerging surface. In contrast, the downward prism sheet is a prism sheet designed so that the prism surface should serve as a light entering surface.

Surface light sources utilizing such a downward prism sheet have a problem that, although the front luminance is increased, luminance for a direction of an angle slightly deviated from the front direction (direction of the normal of the light emerging surface of the light guide panel) is markedly reduced, and thus the viewing angle is narrowed, that is, the directivity of lights emerging from the surface light sources becomes unduly high. Therefore, a significant difference in brightness is caused between the central part and peripheral part of a screen depending on the parallactic angles of viewers.

Thus, a surface light source device is proposed by Patent document 1, in which the viewing angle is widened by disposing a light diffusing sheet on a surface of downward prism sheet opposite to the prism surface, and generation of iridescent ring pattern is avoided by forming convexo-concaves on the surface of the light diffusing sheet facing the downward prism sheet. However, with such a light diffusing sheet having a rough surface, when the rough surface contacts with the prism sheet, the rough surface damages the contacted surface, and therefore a problem is caused that display quality of a display apparatus using the surface light source device is degraded. For this reason, it is necessary to provide a gap between the prism sheet and the light diffusing sheet to secure a non-contact state, which inhibits manufacture of thinner surface light source devices.

SUMMARY

An object of the present invention is to provide a light control film comprising a downward prism sheet and a light diffusing sheet having a rough surface on a side (surface) facing the downward prism sheet, which solves the problem of mutual scratching of constituent members. Another object of the present invention is to provide a surface light source which does not suffer from degradation of display quality due to scratching of constituent members when it is incorporated into a display apparatus such as liquid crystal display panels.

That is, the light control sheet provided by the present invention is a light control sheet comprising at least a light diffusing film and a prism sheet, wherein the light diffusing film has a light diffusing surface on one side and a rough surface on the other side, and the prism sheet has a prism surface on one side and a smooth surface on the other side. The smooth surface is formed by a smooth layer comprising at least a comb polymer, and the rough surface of the light diffusing film and the smooth surface of the prism sheet face each other.

The light control sheet of the present invention is also a light control sheet comprising at least a light diffusing film and a prism sheet, wherein the light diffusing film has a light diffusing surface on one side and a smooth surface on the other side, and the smooth surface is formed by a smooth layer comprising at least a comb polymer. The prism sheet has a prism surface on one side and a rough surface on the other side. The smooth surface of the light diffusing film and the rough surface of the prism sheet face each other.

The aforementioned comb polymer has a stem moiety and a branch moiety, the stem moiety and the branch moiety each have a structure formed by polymerization of monomers, and type of monomers as the main component constituting the stem moiety may be different from type of monomers as the main component constituting the branch moiety.

As the aforementioned comb polymer, one obtained by copolymerizing monomers constituting the stem moiety and macromonomers constituting the branch moiety can be used. The comb polymer may have a configuration that the main component of the monomers constituting the stem moiety consists of acrylic type monomers, the macromonomers constituting the branch moiety have monoethylenycally unsaturated groups as polymerizable functional end groups, and the backbone component of the macromonomers is obtained by polymerizing non-acrylic type monomers as the main component.

As the non-acrylic type monomers, styrene monomers can be used.

The aforementioned comb polymer may account for 40% by weight or more of the constituents of the smooth layer.

Further, the surface light source provided by the present invention is a surface light source comprising a light source, a light guide panel of which end is equipped with the light source, and a light control sheet disposed on a light emerging surface of the light guide panel, wherein the light control sheet of the present invention is disposed as the light control sheet so that the prism surface of the prism sheet and the light emerging surface of the light guide panel should face each other.

If the light control sheet of the present invention is used as a member of a surface light source, generation of iridescent ring pattern can be avoided without degrading the front luminance and viewing angle, and the problem of mutual scratching of constituent members can also be solved. Moreover, if a surface light source utilizing the light control sheet as a constituent member is incorporated into a display apparatus such as a liquid crystal display panel, display quality is not degraded by scratching.

EXPLANATIONS OF NUMERALS

Figure 1:
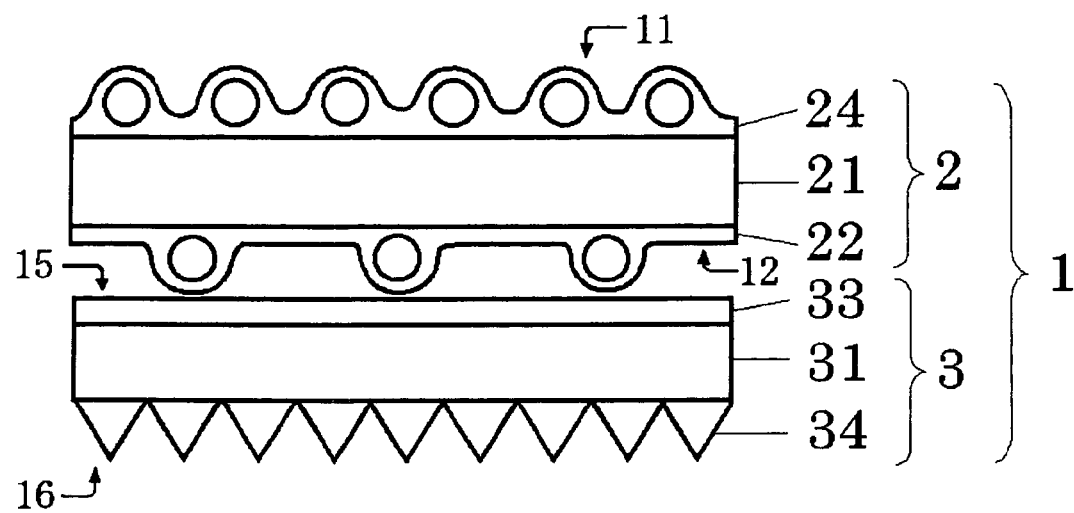
FIG. 1 Sectional view showing an embodiment of the light control sheet of the present invention FIG. 2 Sectional view showing another embodiment of the light control sheet of the present invention FIG. 3 Sectional view showing an embodiment of the surface light source of the present invention FIG. 4 Sectional view showing another embodiment of the surface light source of the present invention FIG. 5 Sectional view showing an embodiment of liquid crystal display apparatus incorporated with the surface light source of the present invention

1 . . . Light control sheet
2 . . . The light diffusing film
3 . . . Prism sheet
21, 31 . . . Transparent polymer film
22, 32 . . . Concavo-convex layer
23, 33 . . . Smooth layer
24 . . . Light diffusing layer
34 . . . Prism layer
4 . . . Light guide plate
5 . . . Light source
6 . . . Surface light source
7 . . . Lamp reflector
8 . . . Light reflection sheet
9 . . . Liquid crystal display panel
10 . . . Liquid crystal display apparatus

DETAILED DESCRIPTION OF THE EMBODIMENTS

Hereafter, the light control sheet of the present invention and the surface light source using the same will be explained in detail.

Figure 2:
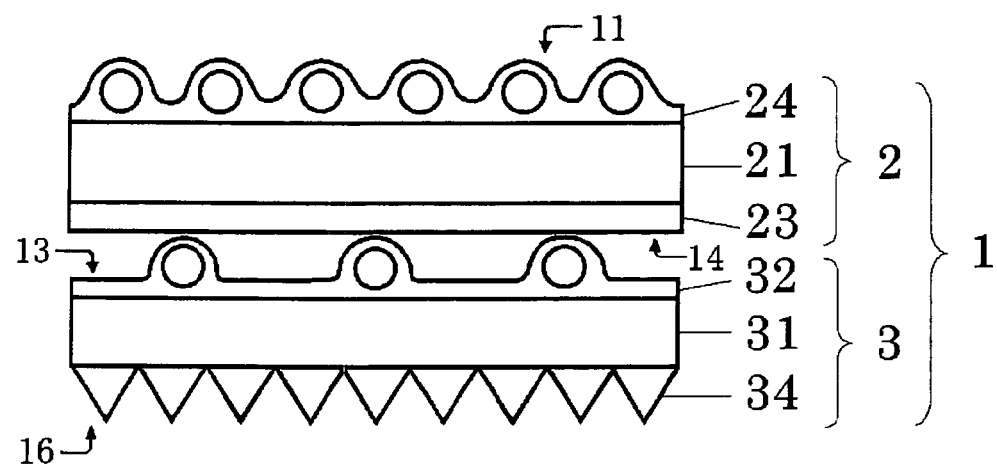

First, the light control sheet of the present invention will be explained. As shown in FIG. 1 or 2, the light control sheet 1 of the present invention comprises a light diffusing film 2 and a prism sheet 3, which are laminated.

The light diffusing film 2 used here has a light diffusing surface 11 on one side and a rough surface 12 on the other side as shown in FIG. 1, or has a light diffusing surface 11 on one side and a smooth surface 14 on the other side as shown in FIG. 2. The prism sheet 3 used here has a prism surface 16 on one side and a smooth surface 15 on the other side as shown in FIG. 1, or has a prism surface 16 on one side and a rough surface 13 on the other side as shown in FIG. 2.

The rough surfaces 12 and 13 of the light diffusing film 2 and the prism sheet 3 can be formed by forming concavo-convex layers 22 and 32 having surface convexo-concaves on transparent polymer films 21 and 31 serving as substrates as shown in FIGS. 1 and 2. It is also possible to directly process the surfaces of the transparent polymer films 21 and 31 into concavo-convex profiles to form the rough surfaces 12 and 13 without forming the concavo-convex layers 22 and 32. The smooth surfaces 14 and 15 of the light diffusing film 2 and the prism sheet 3 are formed by disposing smooth layers 23 and 33 on the surfaces of the transparent polymer films 21 and 31. The smooth layers 23 and 33 consist of materials containing a comb polymer according to this embodiment.

The light diffusing surface 11 of the light diffusing film 2 may have any structure so far as it provide a light diffusing effect, and it may be obtained by directly processing the surface of the transparent polymer film 21, or may have a structure that the light diffusing layer 24 is disposed on the surface of the transparent polymer film 21 as shown in FIGS. 1 and 2. Similarly, the prism surface 16 of the prism sheet 3 may have any structure so far as it directs the incident lights toward the direction of the normal of the prism sheet 3, and it may be obtained by directly processing the surface of the transparent polymer sheet 31, or may have a structure that a prism layer 34 having a prismatic profile is disposed on the surface of the transparent polymer film 31 as shown in FIGS. 1 and 2.

As the transparent polymer-films 21 and 31 used here, films which do not degrade transparency can be used. Examples of such films include those of polyethylene terephthalate, polybutylene terephthalate, polyethylene naphthalate, polycarbonate, polyethylene, polypropylene, polystyrene, triacetylcellulose, acrylic resin, and polyvinyl chloride. Stretched, in particular, biaxially stretched polyethylene terephthalate films are preferred, because of superior mechanical strength and dimensional stability thereof. Moreover, a film having an improved adhesiveness to the concavo-convex layer 22, smooth layers 23 and 33, light diffusing layer 24, prism layer 34 etc. by a corona discharge treatment or by providing an easy adhesion layer are also preferably used. Although thickness of such transparent polymer films 21 and 31 is appropriately chosen according to the material used, it is generally 25 to 500 μm, preferably 25 to 200 μm, and it is particularly preferably 25 to 50 μm in order to meet manufacture of thinner surface light sources.

The rough surfaces 12 and 13 provided on one side of the light diffusing film 2 or the prism sheet 3 may be obtained by directly processing the surfaces of the transparent polymer films 21 and 31, or by forming layers 22 and 32 on the surfaces of the transparent polymer films 21 and 31 to make the surfaces convexo-concave. Although the surface profile of the rough surface is not essentially limited so long as the object of the present invention can be achieved, it is particularly preferred that the surface should have an arithmetical mean deviation of 0.5 μm or less, and a mean spacing of roughness of 80 μm or less. The arithmetical mean deviation and mean spacing of roughness referred to herein are the arithmetical mean deviation and mean spacing of roughness defined in JIS-B 0601:1994, and represented by values measured with a surface roughness measuring apparatus. If the arithmetical mean deviation of the rough surfaces 12 and 13 is 0.5 μm or less, sufficient front luminance and sufficient viewing angle of a surface light source can be obtained and they are hardly degraded when the light control sheet 1 of the present invention is used for the surface light source. If the mean spacing of roughness is 80 μm or less, it becomes easy to suppress generation of iridescent ring pattern when the light control sheet 1 of the present invention is used for a surface light source. Furthermore, it is preferred that the arithmetical mean deviation should be 0.15 μm or more in view of ease for making the mean spacing of roughness to be 80 μm or less, and it is preferred that the mean spacing of roughness should be 60 μm or more in view of ease for making the arithmetical mean deviation to be 0.5 μm or less.

The method for forming concaves and convexes of the rough surfaces 12 and 13 is not particularly limited so long as a concavo-convex profile can be formed. For example, when a rough surface is directly formed as the surface of the transparent polymer films 21 and 31, they can be formed by bringing uncured or half-cured transparent polymer films 21 and 31 during the production thereof into contact with a shaping film having a specific surface profile or the like to transfer the specific surface profile to the surface. When the concavo-convex layers 22 and 32 are formed, a resin can be applied to the transparent polymer films 21 or 31, and a shaping film or the like can be similarly used while the resin is in an uncured or half-cured state to transfer a profile. It is preferable to form the concavo-convex layers 22 and 32 by using a material containing a binder resin and particles in view of easiness of controlling the surface profile and easiness of production. In such a case, the surface profiles of the concavo-convex layers 22 and 32 containing a binder resin and particles can be controlled by adjusting factors of thickness of the layers, mixing ratio of binder resin and particles, particle size, particle number per unit area, and so forth. The concavo-convex profile should be controlled in consideration of optical characteristics as a light control sheet.

As the binder resin constituting the concavo-convex layers 22 and 32, usable are optically transparent thermoplastic resins, thermosetting resins, ionizing radiation curable resins and so forth, such as polyester resins, acrylic resins, polyester acrylate resins, polyurethane acrylate resins, epoxy acrylate resins, cellulose resins, acetal resins, vinyl resins, polyethylene resins, polystyrene resins, polypropylene resins, polyamide resins, polyimide resins, melamine resins, phenol resins, silicone resins, and fluorocarbon resins. Especially preferred examples of the resin include acrylic resins, which have weather resistance and are highly transparent, and particularly preferred are 2-pack curing type polyurethane acrylate resins. In order to obtain a tough coated film even when a large amount of resin particles are added, it is desirable to use those having a high OH value, which provides a high crosslinking density.

As the particles contained in the concavo-convex layers 22 and 32, usable are extender pigments such as calcium carbonate, magnesium carbonate, barium sulfate, silica, aluminum hydroxide, kaolin, clay and talc, synthetic resin particles such as acrylate resin particles, polystyrene resin particles, polyurethane resin particles, polyethylene resin particles, benzoguanamine resin particles, and epoxy resin particles, and particulate waxes such as hydrocarbon type waxes, aliphatic acid type waxes, and fatty amide type waxes. As for mean particle diameter of such particles, those having a mean particle diameter not smaller than 1 µm and not larger than 10 µm can be used. In particular, it is desirable to use a mixture of particles having a mean particle diameter not smaller than 1 µm and smaller than 5 µm, preferably not larger than 4 µm, and particles having a mean particle diameter not smaller than 5 µm, preferably not smaller than 6 µm, and not larger than 10 µm. As for the mixing ratio of the particles, it is desirable to use the particles in an amount not less than 1 part by weight, preferably not less than 2 parts by weight, and not more than 10 parts by weight, preferably not more than 8 parts by weight, with 100 parts by weight of the binder resin, and when a mixture of particles having different mean particle diameters is used, it is desirable to use the particles in an amount not less than 0.5 part by weight, preferably not less than 1 part by weight, and not more than 9.5 parts by weight, preferably not more than 7 parts by weight, with 100 parts by weight of the binder resin.

On the smooth surfaces 14 and 15 of the light diffusing film 2 and the prism sheet 3, the smooth layers 23 and 33 comprising at least a comb polymer are provided, so that the smooth surfaces 14 and 15 should not be scratched when they are brought into contact with the facing rough surfaces 13 and 12. The comb polymer is a polymer having a stem moiety and a branch moiety. Molecules of the comb polymer are likely to twist around within the molecule or around other polymer molecules, because of the presence of the branch moieties, and thus form a layer having a higher strength compared with usual polymers. Therefore, by forming the smooth layers 23 and 33 with a material containing the comb polymer, anti-scratch property of the smooth layers 23 and 33 can be improved.

As monomers to be polymerized for producing polymers constituting the stem moiety and the branch moiety, various monomers can be used. If monomers of different types are used for the stem moiety and the branch moiety, the branch moiety causes microphase separation with respect to the stem moiety and comes to be likely to form a shape spreading from the stem moiety and thus comes to be more likely to twist around polymer molecules, and therefore it is desirable to use monomers of different types. An example of such a case is that acrylic type monomers are used for the stem moiety, and non-acrylic type monomers are used for the branch moiety. However, it is not essential to necessarily use monomers of different types for the stem moiety and the branch moiety, and so far as the comb polymer is used, the effect that it is more likely to twist around polymer molecules compared with other polymers can be obtained, and therefore anti-scratching property is improved.

Further, the stem moiety preferably has superior coating property. Although it is more preferred that the branch moiety exhibits favorable adhesion for the transparent polymer films 21 and 31, or favorable compatibility with other resins to be blended with the comb polymer, if the stem moiety exhibits superior adhesion for the transparent polymer films 21 and 31 and superior compatibility with other resins to be blended, the branch moiety may not necessarily have such properties.

The comb polymer is preferably obtained by copolymerizing monomers constituting the stem moiety and macromonomers constituting the branch moiety. The comb polymer obtainable by such a macromonomer method is preferred, because it can be prepared by one step of reaction, and it is easy to obtain an objective molecule. Further, in order to obtain favorable coating property, it is preferred that the main component of the monomers constituting the stem moiety consist of acrylic type monomers, the macromonomers constituting the branch moiety have monoethylenycally unsaturated groups as polymerizable functional end groups, and the backbone component of the macromonomers is obtained by polymerization using non-acrylic type monomers as the main component. It is desirable that the main component accounts for 50% by weight or more, preferably 60% by weight or more, of the monomer components to be polymerized.

Examples of the acrylic type monomers include acrylic ester monomers such as methyl acrylate, ethyl acrylate, propyl acrylate, butyl acrylate, amyl acrylate, 2-ethylhexyl acrylate, octyl acrylate, cyclohexyl acrylate and benzyl acrylate, methacrylic acid ester monomers such as butyl methacrylate, 2-ethylhexyl methacrylate, cyclohexyl methacrylate and benzyl methacrylate, carboxyl group-containing acrylic type monomers such as acrylic acid and methacrylic acid, ☐ydroxyl-containing acrylic type monomers such as 2-hydroxyethyl(meth)acrylate, 2-hydroxypropyl(meth)acrylate, 4-hydroxybutyl(meth)acrylate and N-methylolacrylamide, tertiary amino group-containing acrylic type monomers such as dimethylaminoethyl(meth)acrylate and diethylaminopropyl(meth)acrylate, amide group-containing acrylic type monomers such as acrylamide and methacrylamide, N-substituted amide group-containing acrylic type monomers such as N-methyl(meth)acrylamide, N-ethyl(meth)acrylamide, N-methoxymethyl(meth)acrylamide, N-ethoxymethyl(meth)acrylamide, N-t-butylacrylamide and N-octylacrylamide, and so forth.

It is also possible to polymerize the acrylic type monomers together with non-acrylic type monomers such as vinyl acetate, vinyl propionate, vinyl ether and styrene as a side ingredient.

As the macromonomers which serve as constituents of the branch moiety, macromonomers having monoethylenycally unsaturated groups as polymerizable functional end groups and a backbone component obtained by polymerization using non-acrylic type monomers as the main component can be preferably used. If such macromonomers are used when the monomers constituting the stem moiety are polymerized, the monoethylenycally unsaturated groups as polymerizable functional end groups of such macromonomers are graft-polymerized on the stem moiety, and therefore a comb polymer of which branch moiety is constituted by the macromonomers can be synthesized.

Examples of the non-acrylic type monomers used as the main component of the backbone component of these macromonomers include vinyl propionate, vinyl ether, styrene, and so forth mentioned above. When polyethylene terephthalate films are used as the transparent polymer films 21 and 31, by using styrene monomers, in particular, as the non-acrylic type monomers, difference in refractive indexes of the transparent polymer films 21 and 31 and the smooth layers 23 and 33 can be decreased, and thus total light transmission can be increased. Moreover, it is also possible to polymerize the aforementioned acrylic type monomers in the backbone component as a side ingredient.

The amount of the macromonomers of the branch moiety to be copolymerized with the monomers of the stem moiety is desirably 1 part by weight or more, preferably 2 parts by weight or more, and 30 parts by weight or less, preferably 15 parts by weight or less, with respect to 100 parts by weight of the monomers for the stem moiety.

The smooth layers 23 and 33 preferably contain 40% by weight or more, more preferably 50% by weight or more, of the comb polymer based on the constituents of the smooth layers 23 and 33. As the constituents of the smooth layers 23 and 33, the resins exemplified above as binder resins constituting the concavo-convex layers 22 and 32 may also be contained by blending them with the comb polymer.

Hereafter, the light diffusing surface 11 of the light diffusing film 2 will be explained. The profile of this light diffusing surface 11 of the light diffusing film 2 is not particularly limited so long as a light diffusing function is imparted to the surface of the light diffusing film 2.

For example, when the light diffusing surface 11 is directly formed as the surface of the transparent polymer film 21, the light diffusing surface 11 can be formed by bringing an uncured or half-cured transparent polymer film 21 during the production thereof into contact with a shaping film having a specific surface profile or the like to transfer a profile randomly refracting lights to the surface. When the light diffusing surface 11 is formed with the light diffusing layer 24, a resin can be applied to the transparent polymer film 21, and the applied layer in an uncured or half-cured state can be brought into contact with a shaping film having a specific surface profile or the like to transfer a profile randomly refracting lights to the surface and thereby form the light diffusing layer 24 having the light diffusing surface 11. Further, it is preferable to form the light diffusing layer 24 by using a material containing a binder resin and light diffusing particles in view of ease of controlling the surface profile and ease of production. In this case, optical characteristics of the light diffusing layer 24 can be controlled by adjusting factors of thickness of the layer, mixing ratio of the binder resin and light diffusing particles, particle size, particle number per unit area, and so forth.

As the binder resin and the light diffusing particles forming the light diffusing layer 24, the binder resins and particles exemplified above as those for forming the convexo-concave layers 22 and 32 can be used.

The light diffusing particles forming the light diffusing layer 24 are preferably mixed in an amount not less than 30 parts by weight, preferably not less than 40 parts by weight, and not more than 80 parts by weight, preferably not more than 70 parts by weight, with 100 parts by weight of the binder resin. With an amount not less than 30 parts by weight, it becomes easier to obtain a favorable viewing angle when the light control sheet 1 is used for a surface light source, and with an amount not more than 80 parts by weight, it becomes easier to obtain favorable front luminance when the light control sheet is used for a surface light source. Further, the thickness of the light diffusing layer is desirably not less than 1 μm, preferably not less than 5 μm, and not more than 18 μm, preferably not more than 15 μm.

The aforementioned concavo-convex layers 22 and 32, smooth layers 23 and 33, and the light diffusing layer 24 may optionally contain additives such as dispersing agents, antistatic agents and leveling agents, if needed, to such an extent that the functions of the light control sheet of the present invention should not be degraded. Further, these concavo-convex layers 22 and 32, smooth layers 23 and 33, and the light diffusing layer 24 can be formed by mixing the binder resin and so forth with particles, additives and dilution solvents as required to prepare a coating solution, and applying the solution on the surfaces of the transparent polymer films 21 and 31 by a conventionally known application method.

Hereafter, the prism surface 16 of the prism sheet 3 will be explained. The profile of the prism surface 16 is not particularly limited so long as it has a function of, when the light control sheet 1 of the present invention is disposed so that the prism surface 16 should face a light emerging surface of a light guide panel, directing lights emerging from the light emerging surface of the light guide plate and entered into the prism sheet to a direction substantially corresponding to the direction of the normal of the light guide plate. However, a profile of which section substantially has a shape of consecutive approximate V-shapes is preferred.

As for the method of forming the prism layer 34, for example, it can be prepared by a method of casting an ultraviolet curable resin solution on a revolving engraved roll having a surface profile complimentary to the prismatic profile of the prism layer, then providing the transparent polymer film 31 serving as a base sheet thereon, pressing it on the engraved roll from above the resin solution, irradiating the resin solution with ultraviolet rays in the pressed state to cure the resin solution, and then separating the solidified ultraviolet curing resin from the revolving engraved roll together with the transparent polymer film 31.

If the light control sheet 1 of the present invention prepared by laminating the aforementioned light diffusing films 2 and prism sheets 3 so that the rough surfaces 12 and 13 and the smooth surfaces 15 and 14 should face each other, respectively, is used as a constituent member of a surface light source, it becomes possible to avoid generation of iridescent ring pattern without degrading the front luminance and viewing angle, and solve the problem of mutual scratching of constituent members. Thus, when the surface light source is incorporated into a liquid crystal display panel or the like, degradation of display quality in liquid crystal display apparatuses and the like caused by such scratching can be prevented.

Figure 3:
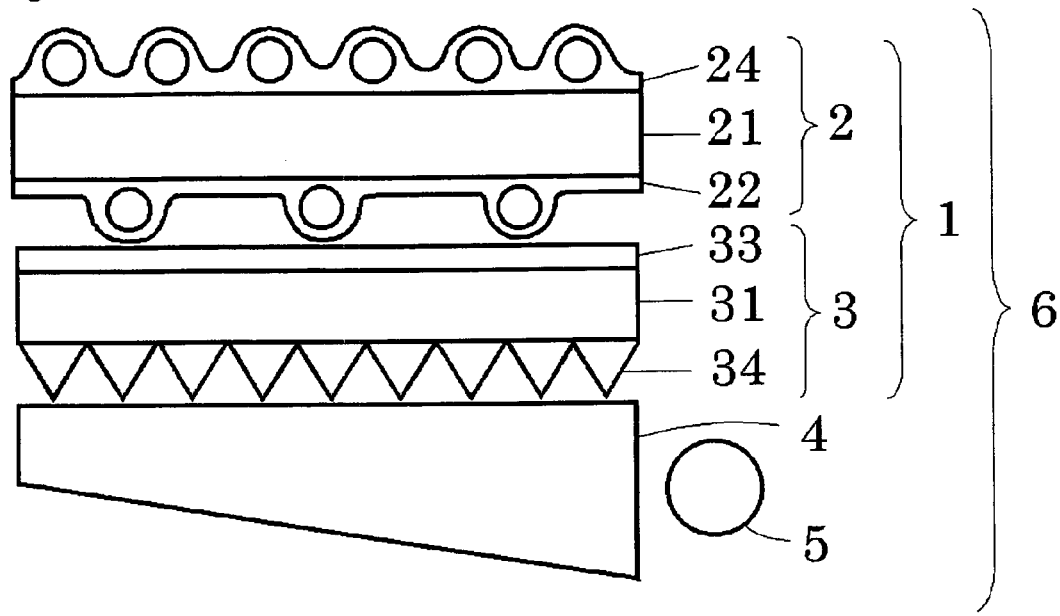
Figure 4:
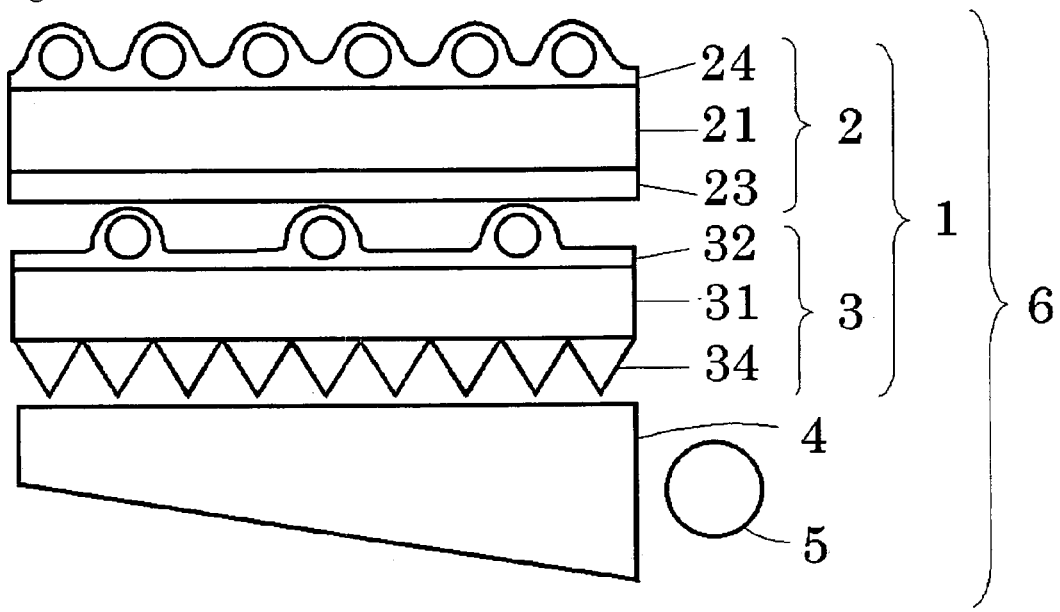

Hereafter, the surface light source utilizing the light control sheet 1 of the present invention will be explained. The surface light source 6 of the present invention has at least the light guide plate 4 equipped with the light source 5 at the end thereof and the light control sheet 1 of the present invention disposed on the light emerging surface of the light guide plate 4, and the light control sheet 1 is disposed so that the prism surface 16 of the prism sheet 3 thereof should face the light emerging surface of the light guide plate 4 (FIGS. 3 and 4).

As the light source 5 disposed at the end of the light guide plate 4, for example, a lamp such as a cold-cathode tube can be used, and as the light guide plate 4, a highly transparent and approximately plate-shaped member molded so that one side thereof should serve as a light entering surface and a surface approximately perpendicular to the side should serve as a light emerging surface can be used. The light guide plate 4 may be one in which a prismatic profile is formed on the surface of the light emerging surface side or the surface of the opposite side, or one molded by mixing light diffusing particles and so forth in the light guide plate 4.

Figure 5:
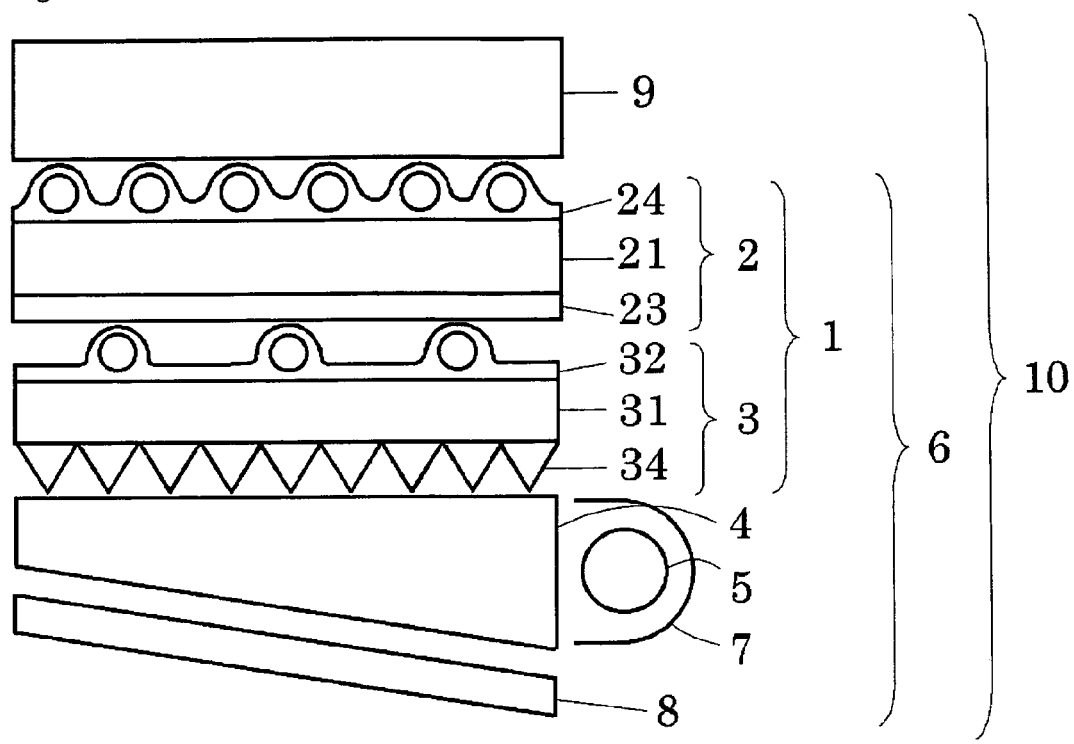

Besides the above components, the surface light source 6 of the present invention is preferably provided with a light reflection member called lamp reflector 7 covering the light source 5, and a light reflection member called light reflection sheet 8 on the surface of the light guide plate 4 opposite to the light emerging surface. Further, such a surface light source 6 of the present invention can be stacked with a liquid crystal display panel 9 to constitute a liquid crystal display apparatus 10, and so forth (FIG. 5).

Because the surface light source of the present invention described above is constituted by using the light control sheet of the present invention, it can avoid generation of iridescent ring pattern without degrading the front luminance and viewing angle, and solve the problem of mutual scratching of constituent members, and therefore when it is incorporated into a liquid crystal display panel or the like, it can prevent degradation of display quality caused by such scratching.

EXAMPLES

Hereafter, the present invention will be further explained with reference to examples. The term and symbol "part" and "%" are used on the weight basis, unless otherwise indicated.

a. Synthesis of Comb Polymer

Synthesis Example 1

To a reaction vessel equipped with a stirrer, condenser, thermometer and nitrogen introducing pipe, 60 g of ethyl acetate, 60 g of toluene, 60 g of methyl ethyl ketone, 95 g of methyl methacrylate monomers and 5 g of styrene macromonomers having monoethylenycally unsaturated groups as polymerizable functional end groups (AS-6, Toagosei Co., Ltd.) were charged, and the mixture was heated at 80° C. with stirring and introducing nitrogen. In an amount of 0.3 g of 50 weight % flakes of benzoyl peroxide (Nyper FF, Nippon Oil & Fats Co., Ltd.) dissolved in 20 g of methyl ethyl ketone in another container was added to the reaction vessel. Then, the reaction was completed over 8 hours with stirring while the reaction solution was maintained at 80° C. to synthesize a comb polymer of which stem moiety consisted of polymethyl methacrylate and branch moiety consisted of polystyrene, and thus obtain a resin solution A having a solid content of 33.3%.

b. Synthesis of Styrene Resin

Synthesis Example 2

To a reaction vessel equipped with a stirrer, condenser, thermometer and nitrogen introducing pipe, 60 g of ethyl acetate, 60 g of toluene, 60 g of methyl ethyl ketone and 100 g of styrene monomers were charged, and the mixture was heated at 80° C. with stirring and introducing nitrogen. In an amount of 0.3 g of 50 weight % flakes of benzoyl peroxide (Nyper FF, Nippon Oil & Fats Co., Ltd.) dissolved in 20 g of methyl ethyl ketone in another container was added to the reaction vessel. Then, the reaction was completed over 8 hours with stirring while the reaction solution was maintained at 80° C. to synthesize a styrene resin, and thus obtain a resin solution B having a solid content of 33.3%.

c. Preparation of Light Control Sheets

Example 1

As the transparent polymer film 21, a transparent polyethylene terephthalate film having a thickness of 50 μm (COSMOSHINE A4300, Toyobo Co., Ltd.) was prepared, and a coating solution [a] for concavo-convex layer having the following composition was applied on one surface of the film, dried and cured by heating to form a concavo-convex layer 22 having a thickness of about 4 μm. Then, on the surface of the film opposite to the surface provided with the concavo-convex layer 22, a coating solution [b] for light diffusing layer having the following composition was applied, dried and cured by heating to form a light diffusing layer 24 having a thickness of about 12 μm and thereby prepare a light diffusing film 2 having the structure shown in FIG. 1, which is a constituent member of the light control sheet 1 of the present invention shown in FIG. 1.

| <Coating solution [a] for concavo-convex layer> | |
|---|---|
| Acrylic polyol (ACRYDIC A-807, solid content: 50%, Dainippon Ink &Chemicals, Inc.) | 162 parts |
| Isocyanate (Takenate D110N, solid content: 60%, Mitsui Takeda Chemicals, Inc.) | 32 parts |
| Polyethylene wax dispersion (solid content: 10%, mean particle size: 3 μm) | 30 parts |
| Acrylic resin particles (Techpolymer MB30X-10S, mean particle diameter: 10 μm, Sekisui Plastics Co., Ltd.) | 0.5 part |
| Butyl acetate | 200 parts |
| Methyl ethyl ketone | 200 parts |

| <Coating solution [b] for light diffusing layers> | |
|---|---|
| Acrylic polyol (ACRYDIC A-807, solid content: 50%, Dainippon Ink &Chemicals, Inc.) | 162 parts |
| Isocyanate (Takenate D110N, solid content: 60%, Mitsui Takeda Chemicals, Inc.) | 32 parts |
| Acrylic resin particles (GANZPEARL GM-0630H, mean particle size: 6 μm, Ganz Chemical Co., Ltd.) | 60 parts |
| Butyl acetate | 200 parts |
| Methyl ethyl ketone | 200 parts |

Then, a coating solution [c] for smooth layer having the following composition was applied to a surface of a commercially available downward prism sheet (DIAART S168, Mitsubishi Rayon Co., Ltd.) opposite to the prism surface thereof to form a smooth layer 33 having a thickness of about 3 μm and thereby prepare a downward prism sheet 3 shown in FIG. 1, which is a constituent member of the light control sheet 1 of the present invention shown in FIG. 1.

| <Coating solution [c] for smooth layer> | |
|---|---|
| Resin solution A | 135 parts |
| Acrylic resin (ACRYDIC A-165, solid content: 45%, Dainippon Ink &Chemicals, Inc.) | 100 parts |
| Butyl acetate | 332.5 parts |
| Methyl ethyl ketone | 332.5 parts |

Then, the light diffusing film 2 and the downward prism sheet 3 were laminated so that the surface 12 of the light diffusing film 2 having the concavo-convex layer 22 and the surface 15 of the downward prism sheet 3 having the smooth layer 33 should face each other to prepare a light control sheet 1 of the present invention having the structure shown in FIG. 1.

Example 2

A light diffusing film 2 and a downward prism sheet 3 as constituent the members of the light control sheet 1 of the present invention having the structure shown in FIG. 2 were prepared in the same manner as that of Example 1 except that the aforementioned coating solution c for smooth layers was used instead of the coating solution [a] for concavo-convex layer to be applied to the transparent polymer film (polyethylene terephthalate film) 21 in the preparation of the light diffusing film 2 to form the smooth layer 23, and the coating solution [a] for concavo-convex layer was used instead of the coating solution [c] for smooth layer to be applied to the surface of the prism sheet opposite to the prism surface 16 to form the concavo-convex layer 32.

Then, the light diffusing film 2 and the downward prism sheet 3 were laminated so that the surface 14 of the light diffusing film 2 having the smooth layer and the surface 13 of the downward prism sheet 3 having the concavo-convex layer 32 should face each other to prepare a light control sheet 1 of the present invention having the structure shown in FIG. 2.

a. Comparative Example

A light diffusing film and a downward prism sheet of Comparative Example 1 were prepared in the same manner as that of Example 1 except that a coating solution [d] for smooth layer having the following composition not containing the comb polymer was used instead of the coating solution [c] for smooth layer to be applied to the surface of the prism sheet opposite to the prism surface to form a smooth layer 33.

| <Coating solution [d] for smooth layer> | |
|---|---|
| Acrylic resin (ACRYDIC A-165, solid content: 45%, Dainippon Ink &Chemicals, Inc.) | 200 parts |
| Butyl acetate | 350 parts |
| Methyl ethyl ketone | 350 parts |

Then, the light diffusing film and the downward prism sheet of Comparative Example 1 were laminated so that the surface of the light diffusing film having the concavo-convex layer and the surface of the downward prism sheet having the smooth layer 33 should face each other to prepare a light control sheet of Comparative Example 1 having a structure similar to that shown in FIG. 1.

b. Comparative Example

A light diffusing film and a downward prism sheet of Comparative Example 2 were prepared in the same manner as that of Example 2 except that the smooth layer 23 was not formed on one surface of the transparent polymer film (polyethylene terephthalate film) 21 in the preparation of the light diffusing film 2.

Then, the light diffusing film and the downward prism sheet of Comparative Example 2 were laminated so that the surface of the light diffusing film opposite to the surface having the light diffusing layer 24 and the surface of the downward prism sheet having the concavo-convex layer 32 should face each other to prepare a light control sheet of Comparative Example 2.

c. Comparative Example

A light diffusing film and a downward prism sheet of Comparative Example 3 were prepared in the same manner as that of Example 1 except that the concavo-convex layer 22 was not formed in the preparation of the light diffusing film 2, and the smooth layer 33 of the prism sheet 3 was not formed.

Then, the light diffusing film and the downward prism sheet of Comparative Example 3 were laminated so that the surface of the light diffusing film opposite to the light diffusing surface 11 and the surface of the downward prism sheet opposite to the prism surface 16 should face each other to prepare a light control sheet of Comparative Example 3.

d. Comparative Example

A light diffusing film and a downward prism sheet of Comparative Example 4 were prepared in the same manner as that of Example 2 except that a coating solution [e] for smooth layer having the following composition was used instead of the coating solution [c] for smooth layer to be applied to the surface of the light diffusing film 2 opposite to the surface having the light diffusing layer 24 to form a smooth layer 23.

| <Coating solution [e] for smooth layer> | |
|---|---|
| Resin solution B | 135 parts |
| Acrylic resin (ACRYDIC A-165, solid content: 45%, Dainippon Ink &Chemicals, Inc.) | 100 parts |
| Butyl acetate | 332.5 parts |
| Methyl ethyl ketone | 332.5 parts |

Then, the light diffusing film and the downward prism sheet of Comparative Example 4 were laminated so that the surface of the light diffusing film having the smooth layer 23 and the surface of the downward prism sheet 3 having the concavo-convex layer 32 should face each other to prepare a light control sheet of Comparative Example 4.

d. Preparation of Surface Light Sources

Example 3

As shown in FIG. 3, a cold-cathode tube (light source 5) covered with a lamp reflector was disposed aside of one side of a light guide plate 4 having a diagonal of 8.4 inches (1 inch=25.4 mm) as a light incident surface. On the light emerging surface of the light guide plate 4, the light control sheet 1 obtained in Example 1 was disposed so that the prism surface 16 of the prism sheet 3 and the light emerging surface of the light guide plate 4 should face to each other. On the surface of the light guide plate 4 opposite to the light emerging surface, a light reflection member (not shown in FIG. 3) was disposed to prepare a surface light source having the structure according to the present invention shown in FIG. 3. As the prism sheet 3 constituting the light control sheet 1, one subjected to the following rubbing test in which the rough surface of the light diffusing film 2 and the smooth surface of the prism sheet were rubbed against each other was used.

Rubbing Test

On a moving stand of a surface tester (HEIDON-14, Shinto Scientific Co., Ltd.), a prism sheet 3 having a diagonal of 8.4 inches was fixed so that a prism surface should face the moving stand, a light diffusing film 2 was attached to a surface contact jig so that contact area of a smooth surface 15 of the prism sheet 3 and a rough surface 12 of the light diffusing film 2 should be about 40 cm$^2$, a weight of 1 kg was put on the surface contact jig, and the moving stand was moved at a rate of 1 m/min to rub the rough surface 12 of the light diffusing film 2 and the smooth surface 15 of the prism sheet 3 together.

Example 4

As shown in FIGS. 4 and 5, a cold-cathode tube (light source 5) covered with a lamp reflector 7 was disposed aside of one side of a light guide plate 4 having a diagonal of 8.4 inches (1 inch=25.4 mm) as a light incident surface. On the light emerging surface of the light guide plate 4, the light control sheet 1 obtained in Example 2 was disposed so that the prism surface 16 of the prism sheet 3 and the light emerging surface of the light guide plate 4 should face each other. On the surface of the light guide plate 4 opposite to the light emerging surface, a light reflection member (light reflection sheet) 8 was disposed to prepare a surface light source having the structure according to the present invention shown in FIGS. 4 and 5. As the light diffusing sheet 2 constituting the light control sheet 1, one subjected to a rubbing test in which the rough surface 13 of the prism sheet 3 and the smooth surface of the light diffusing sheet were rubbed together was used. The rubbing test was performed in the same manner as that of the rubbing test used in Example 3, except that the places on which the prism sheet 3 and the light diffusing film 2 were attached were exchanged. The rough surface 13 of the prism sheet 3 and the smooth surface 14 of the light diffusing film 2 were rubbed together in the same manner as that of Example 3 except for the change mentioned above.

Comparative Examples 5 to 8

As shown in FIG. 3 or 4, a cold-cathode tube (light source 5) covered with a lamp reflector was disposed aside of one side of a light guide plate 4 having a diagonal of 8.4 inches (1 inch=25.4 mm) as a light incident surface. On the light emerging surface of the light guide plate 4, each of the light control sheets obtained in Comparative Examples 1 to 4 was disposed so that the prism surface of the prism sheet and the light emerging surface of the light guide plate 4 should face to each other. On the surface of the light guide plate 4 opposite to the light emerging surface, a light reflection member was disposed to prepare each of the surface light sources of Comparative Examples 5 to 8. As the prism sheets constituting the light control sheets of Comparative Examples 1 and 3, those subjected to a rubbing test performed in the same manner as that used in Example 3 were used, and as the prism sheets constituting the light control sheets of Comparative Examples 2 and 4, those subjected to a rubbing test performed in the same manner as that used in Example 4 were used.

e. Evaluation

The cold-cathode tubes (light source 5) of the surface light sources obtained in Examples 3 and 4 and Comparative Examples 5 to 8 as described above were turned on, and front luminance, viewing angle and generation of iridescent ring pattern were evaluated by visual inspection. At the same time, liquid crystal display panels were disposed on the surface light sources, and presence or absence of degradation of display quality of the liquid crystal display apparatus caused by the problem of mutual scratching of constituent members of light control sheets was evaluated by visual inspection. The results are shown in Table 1.

TABLE 1

| | Example | | Comparative Example | | | |
|---|---|---|---|---|---|---|
| | 3 | 4 | 5 | 6 | 7 | 8 |
| Front luminance | No problem | No problem | No problem | No problem | No problem | No problem |
| Viewing angle | No problem | No problem | No problem | No problem | No problem | No problem |
| Iridescent ring pattern | No problem | No problem | No problem | No problem | Ring pattern | No problem |
| Degradation of display quality | No problem | No problem | Degradation of display quality | Degradation of display quality | Degradation of display quality | Degradation of display quality |

As clearly seen from the results shown in Table 1, in the surface light sources constituted by using the light control sheets 1 according to the present invention obtained in Examples 1 and 2 (Examples 3 and 4), generation of iridescent ring pattern was avoided without degrading the front luminance and viewing angle, at the same time, the problem of mutual scratching of constituent members was solved, and thus degradation of display quality of the liquid crystal display apparatus caused by scratching was not observed.

On the other hand, in the surface light sources constituted by using the light control sheets obtained in Comparative Examples 1, 2 and 4 (Comparative Examples 5, 6 and 8), although generation of iridescent ring pattern could be avoided, mutual scratching of the constituent members of the light control sheets was generated, and as a result, degradation of display quality was observed in liquid crystal display apparatuses, i.e., scratches were displayed as bright lines.

Further, in the surface light source constituted by using the light control sheet obtained in Comparative Example 3 (Comparative Example 7), front luminance and viewing angle were not degraded, and the problem of mutual scratching of the constituent members of the light control sheet was not caused. However, since both the facing surfaces of the light diffusing film of the light control sheet and the prism sheet were smooth surfaces, an iridescent ring pattern was generated. Therefore, although degradation of display quality generated in liquid crystal display apparatuses due to scratching was not observed, degradation of display quality due to the iridescent ring pattern was observed.

The invention claimed is:

1. A light control sheet comprising at least a light diffusing film and a prism sheet, wherein:
    the light diffusing film has a light diffusing surface on one side and a rough surface on the other side,
    the prism sheet has a prism surface on one side and a smooth surface on the other side, the smooth surface has a smooth layer comprising at least a comb polymer, the comb polymer having a copolymer stem moiety and a branch moiety formed of macromonomers, and
    the rough surface of the light diffusing film and the smooth surface of the prism sheet face each other.

2. The light control sheet according to claim 1, wherein the stem moiety and the branch moiety each includes polymerized monomers, and the type of monomers as the main component constituting the stem moiety is different from the type of monomers as the main component constituting the branch moiety.

3. The light control sheet according to claim 2, wherein the main component of the monomers constituting the stem moiety consists of acrylic type monomers, the macromonomers constituting the branch moiety have monoethylenycally unsaturated groups as polymerizable functional end groups, and the backbone component of the macromonomers has non-acrylic type monomers as the main component.

4. The light control sheet according to claim 3, wherein the non-acrylic type monomers are styrene monomers.

5. The light control sheet according to claim 2, wherein the comb polymer accounts for 40% by weight or more of the constituents of the smooth layer.

6. The light control sheet according to claim 3, wherein the comb polymer accounts for 40% by weight or more of the constituents of the smooth layer.

7. The light control sheet according to claim 4, wherein the comb polymer accounts for 40% by weight or more of the constituents of the smooth layer.

8. A surface light source comprising a light source, a light guide plate arranged with one end facing the light source, and a light control sheet according to claim 2 disposed on a light emerging surface of the light guide plate, wherein:
    the light control sheet is disposed so that the prism surface of the prism sheet and the light emerging surface of the light guide plate face each other.

9. The light control sheet according to claim 1, wherein the comb polymer accounts for 40% by weight or more of the constituents of the smooth layer.

10. A surface light source comprising a light source, a light guide plate arranged with one end facing the light source, and a light control sheet according to claim 1, disposed on a light emerging surface of the light guide plate, wherein:
    the light control sheet is disposed so that the prism surface of the prism sheet and the light emerging surface of the light guide plate face each other.

11. A light control sheet comprising at least a light diffusing film and a prism sheet, wherein:
    the light diffusing film has a light diffusing surface on one side and a smooth surface on the other side, the smooth surface has a smooth layer comprising at least a comb polymer, the comb polymer having a copolymer stem moiety and a branch moiety formed of macromonomers,
    the prism sheet has a prism surface on one side and a rough surface on the other side, and
    the smooth surface of the light diffusing film and the rough surface of the prism sheet face each other.

12. The light control sheet according to claim 11, wherein the stem moiety and the branch moiety each includes polymerized monomers, and the type of monomers as the main component constituting the stem moiety is different from the type of monomers as the main component constituting the branch moiety.

13. The light control sheet according to claim 12, wherein the main component of the monomers constituting the stem moiety consists of acrylic type monomers, the macromonomers constituting the branch moiety have monoethylenycally unsaturated groups as polymerizable functional end groups, and the backbone component of the macromonomers has polymerized non-acrylic type monomers as the main component.

14. The light control sheet according to claim 13, wherein the non-acrylic type monomers are styrene monomers.

15. The light control sheet according to claim 13, wherein the comb polymer accounts for 40% by weight or more of the constituents of the smooth layer.

16. The light control sheet according to claim 14, wherein the comb polymer accounts for 40% by weight or more of the constituents of the smooth layer.

17. A surface light source comprising a light source, a light guide plate arranged with one end facing the light source, and a light control sheet according to claim 12 disposed on a light emerging surface of the light guide plate, wherein:
    the light control sheet is disposed so that the prism surface of the prism sheet and the light emerging surface of the light guide plate face each other.

18. The light control sheet according to claim 12, wherein the comb polymer accounts for 40% by weight or more of the constituents of the smooth layer.

19. The light control sheet according to claim 11, wherein the comb polymer accounts for 40% by weight or more of the constituents of the smooth layer.

20. A surface light source comprising a light source, a light guide plate arranged with one end facing the light source, and a light control sheet according to claim 11 disposed on a light emerging surface of the light guide plate, wherein:
    the light control sheet is disposed so that the prism surface of the prism sheet and the light emerging surface of the light guide plate face each other.

* * * * *